United States Patent
Walsh et al.

(10) Patent No.: US 7,597,921 B2
(45) Date of Patent: *Oct. 6, 2009

(54) TEXTURED WHEY PROTEIN PRODUCT

(75) Inventors: Marie K. Walsh, North Logan, UT (US); Charles E. Carpenter, Wellsville, UT (US)

(73) Assignee: Utah State University, Logan, UT (US)

(*) Notice: Subject to any disclaimer, the term of this patent is extended or adjusted under 35 U.S.C. 154(b) by 796 days.

This patent is subject to a terminal disclaimer.

(21) Appl. No.: 10/644,604

(22) Filed: Aug. 19, 2003

(65) Prior Publication Data

US 2004/0161519 A1 Aug. 19, 2004

Related U.S. Application Data

(63) Continuation-in-part of application No. 09/596,191, filed on Jun. 16, 2000, now Pat. No. 6,607,777.

(60) Provisional application No. 60/140,280, filed on Jun. 18, 1999.

(51) Int. Cl.
*A23C 21/00* (2006.01)

(52) U.S. Cl. .................. 426/583; 426/656; 426/516; 426/465; 426/468

(58) Field of Classification Search ............. 426/583, 426/656, 516, 465, 468
See application file for complete search history.

(56) References Cited

U.S. PATENT DOCUMENTS

| 3,843,816 | A | | 10/1974 | Touba | |
|---|---|---|---|---|---|
| 3,886,299 | A | * | 5/1975 | Feldbrugge et al. | 426/656 |
| 3,917,876 | A | | 11/1975 | Harwood et al. | |
| 3,970,520 | A | * | 7/1976 | Feldman et al. | 426/46 |
| 4,031,267 | A | | 6/1977 | Berry et al. | |
| 4,165,392 | A | | 8/1979 | Kawai et al. | |
| 4,168,322 | A | | 9/1979 | Buckley et al. | |
| 4,209,534 | A | | 6/1980 | Poznanski | |
| 4,239,784 | A | | 12/1980 | Guiraud et al. | |
| 4,251,567 | A | | 2/1981 | Ohyabu et al. | |
| 4,338,340 | A | * | 7/1982 | Morimoto et al. | 426/104 |
| 4,346,652 | A | * | 8/1982 | de Ruyter | 99/483 |
| 4,430,356 | A | * | 2/1984 | Ohyabu et al. | 426/574 |
| 4,517,218 | A | * | 5/1985 | Yackel et al. | 426/656 |
| 5,300,312 | A | * | 4/1994 | Lusas et al. | 426/634 |
| 5,366,748 | A | * | 11/1994 | Villagran et al. | 426/549 |
| 5,773,057 | A | | 6/1998 | Singh | |
| 6,607,777 | B1 | * | 8/2003 | Walsh et al. | 426/583 |

FOREIGN PATENT DOCUMENTS

GB 2120518 12/1983
JP 58-28235 * 2/1983

* cited by examiner

Primary Examiner—Anthony Weier

(57) ABSTRACT

A textured whey protein product for use as a meat extender, meat analog, or snack food is prepared by thermoplastic extrusion of a composition containing whey protein and optionally an edible polysaccharide, such as cornstarch. Whey protein can also be mixed with other edible proteins in certain embodiments of the invention. Puffing of the extruded product results in an expanded snack food product. Methods of making the meat extender product and the snack food product are also shown.

50 Claims, No Drawings

TEXTURED WHEY PROTEIN PRODUCT

CROSS-REFERENCE TO RELATED APPLICATIONS

This application is a continuation-in-part of U.S. application Ser. No. 09/596,191, filed Jun. 16, 2000, now U.S. Pat. No. 6,607,777, which claims the benefit of U.S. Provisional Application No. 60/140,280, filed Jun. 18, 1999, which are hereby incorporated by reference.

STATEMENT REGARDING FEDERALLY SPONSORED RESEARCH OR DEVELOPMENT

Not applicable.

BACKGROUND OF THE INVENTION

This invention relates to food products. More particularly, the invention relates to textured whey protein for use as an extender of ground meat products, meat analog, and snack food and to methods of making thereof.

There is a great demand for an extender of coarse-ground meat products. The market is currently occupied by a variety of textured vegetable proteins (TVPs), especially those from soybeans. Since 1983 most U.S. military purchases of ground beef have specified inclusion of 20% hydrated soy protein. Soy Proteins History, Prospects in Food, 3 INFORM 429-444 (1992). At the Third Annual Soy Symposium held in November, 1998, it was reported that the market for meatless meat products in the U.S. and Canada reached $180 million in 1995, $265 million in 1996, and was expected to reach $376 million in 1998. N. Chapman, Where Is the Soyfood Market Headed, Third Annual Soyfoods Symposium (1998) (www.soyfoods.com/symposium98/ChapmanPaper98.html). It is predicted that the market for meatless meat products will pass one billion dollars by the year 2001.

The market for meatless meat products supplies diverse consumers and is not exclusive to soy products. At least 80% of those consuming meat alternatives do not consider themselves vegetarians; Americans are now simply more open to healthy eating options than in the past. Midwest Grain Products, Inc. produces a texturized wheat gluten called WHEATEX, which is used by Gardenburger in its GARDEN VEGAN VEGGIE PATTIES. M. Davis, Atchison, Kans.-based Grain Products Company Finds New Uses for Gluten, Kansas City Star (Dec. 9, 1998). Considering the meat alternative market, texturized WPC 80 (whey protein concentrate containing 80% protein), a widely available, inexpensive, and nutritious protein source, would be expected to be a competitive product.

Thermoplastic extrusion is one of the methods used to texture protein-containing mixtures. High pressure and temperature (greater than 130° C. to 140° C.) melt globular proteins and carbohydrates into incompatible phases that form a dispersion and contribute to the formation of a fibrous structure. V. Tolstoguzov, Thermoplastic Extrusion—The Mechanism for the Formation of Extrudate Structure and Properties, 70 J. Amer. Oil Chem. Soc. 417-424 (1993). Whey proteins, however, are more heat sensitive than are other proteins. Typical high-temperature extrusion methods would burn whey proteins. Therefore, if whey proteins are to be used for making a textured whey protein product, a method of extruding such proteins without burning them is needed.

In view of the foregoing, it will be appreciated that providing textured whey protein products and methods of making thereof would be significant advancements in the art.

BRIEF SUMMARY OF THE INVENTION

It is an advantage of an illustrative embodiment of the present invention to provide a textured whey protein product suitable for use as an extender of coarse-ground meat products and as a meat analog.

It is also an advantage of an illustrative embodiment of the invention to provide a textured whey protein product suitable for use as a low-fat, sugar-free, high-protein snack food.

It is another advantage of an illustrative embodiment of the invention to provide a method of making a textured whey protein product that is suitable for use as an extender of coarse-ground meat products and as a meat analog.

It is still another advantage of an illustrative embodiment of the invention to provide a method of making a textured whey protein product that is suitable for use as a snack food.

It is yet another advantage of an illustrative embodiment of the invention to use thermoplastic extrusion to produce a textured whey protein product having a stable, meat-like texture for use as an extender of coarse-ground meat products and as a meat analog.

It is another advantage of an illustrative embodiment of the invention to provide a textured whey protein product that has a clean flavor with little or no aftertaste and that blends well with meat products.

It is still another advantage of an illustrative embodiment of the invention to provide a method for using thermoplastic extrusion for making a textured whey protein product without burning such whey proteins.

These and other advantages can be addressed by providing a textured whey protein product comprising a thermoplastic extrusion product of a composition comprising about 40-100% by weight of a whey protein concentrate and about 0-60% by weight of an edible polysaccharide, typically about 40-99% by weight of whey protein concentrate and about 1-60% by weight of edible polysaccharide, and more typically about 60-95% by weight of whey protein concentrate and 5-40% by weight of edible polysaccharide. The whey protein concentrate illustratively comprises about 20-80% by weight of protein in certain embodiments and comprises at least about 80% by weight of protein in other embodiments. The edible polysaccharide is illustratively a member selected from the group consisting of starches, cellulosics, dietary fibers, and mixtures thereof. Illustrative starches include corn, potato, rice, tapioca, bran, and soy starches, modified variants thereof, and mixtures thereof. Illustrative cellulosics include celluloses, modified celluloses, and mixtures thereof. Illustrative dietary fibers include maltodextrin, inulin, fructo-oligosaccharides, pectin, guar gum, and mixtures thereof. In another illustrative embodiment of the invention, the composition further comprises a minor amount of a calcium salt, such as calcium carbonate, calcium chloride, calcium gluconate, calcium lactate, and mixtures thereof. A pH-adjusting agent can also be added to the composition for adjusting the sensory and physical properties of the textured whey protein product.

An illustrative textured whey protein product comprises a thermoplastic extrusion product of a composition comprising about 40-100% by weight of a whey protein concentrate and about 0-60% by weight of an edible polysaccharide, wherein the whey protein concentrate comprises at least about 80% by weight of protein.

In another illustrative embodiment of the invention, a method for making a textured whey protein product comprises:

(a) preparing a composition comprising about 40-100% by weight of a whey protein concentrate and about 0-60% by weight of an edible polysaccharide;

(b) thermoplastically extruding the composition under conditions of temperature and pressure such that the composition is melted and cooked to result in an extrudate; and (c) drying the extrudate to result in the textured whey protein product.

Cooling the extrudate prior to returning it to atmospheric pressure inhibits expansion or puffing of the extrudate and results in a textured whey protein product having a meat-like texture suitable for use as a meat extender or meat analog. If the extrudate is not cooled prior to being returned to atmospheric pressure, then the extrudate expands or puffs, resulting in a textured whey protein product suitable for use as a snack food.

In still another illustrative embodiment of the invention, a textured whey protein product comprises a thermoplastic extrusion product of a composition comprising about 1-80% by weight of a food grade protein and about 20-99% by weight of an edible polysaccharide, wherein the food grade protein comprises at least about 25% by weight of whey protein. Typically, the composition comprises about 15-65% by weight of the food grade protein, and, more typically, it comprises about 16-48% by weight of the food grade protein. In certain illustrative embodiments, the food grade protein further comprises up to about 75% by weight of plant proteins, animal proteins, microbial proteins, or mixtures thereof. Illustrative plant proteins include wheat proteins, rice proteins, soy proteins, corn proteins, legume proteins, and mixtures thereof. Illustrative animal proteins include casein, blood proteins, and mixtures thereof. Typically, the food grade protein comprises at least about 50% by weight of whey protein. The whey protein can comprise sweet whey solids, whey protein concentrate, whey protein isolate, and the like, and mixtures thereof.

In yet another illustrative embodiment of the invention, a method for making a textured whey protein product comprises:

(a) preparing a composition comprising about 1-80% by weight of a food grade protein and about 20-99% by weight of an edible polysaccharide, wherein the food grade protein comprises at least about 25% by weight of whey protein;

(b) thermoplastically extruding the composition under conditions of temperature and pressure such that the composition is melted and cooked to result in an extrudate; and (c) drying the extrudate to result in the textured whey protein product. In certain embodiments of the invention, heating the textured whey protein product causes expansion thereof. The heating can comprise frying, baking, microwave heating, heating in a forced air system, heating in an air tunnel, and the like.

In a still further illustrative embodiment of the invention, a textured whey protein product comprises a thermoplastic extrusion product of a composition comprising about 1-80% by weight of a mixture of food grade proteins and about 20-99% by weight of an edible polysaccharide, wherein the mixture of food grade proteins comprises at least about 25% by weight of whey protein.

In another illustrative embodiment of the invention, a textured whey protein product comprises a thermoplastic extrusion product of a composition comprising about 1-80% by weight of a mixture of food grade proteins and about 20-99% by weight of an edible polysaccharide, wherein the mixture of food grade proteins comprises soy protein and at least about 25% by weight of whey protein.

DETAILED DESCRIPTION

Before the present textured whey protein products and methods of making thereof are disclosed and described, it is to be understood that this invention is not limited to the particular configurations, process steps, and materials disclosed herein as such configurations, process steps, and materials may vary somewhat. It is also to be understood that the terminology employed herein is used for the purpose of describing particular embodiments only and is not intended to be limiting since the scope of the present invention will be limited only by the appended claims and equivalents thereof.

The publications and other reference materials referred to herein to describe the background of the invention and to provide additional detail regarding its practice are hereby incorporated by reference. The references discussed herein are provided solely for their disclosure prior to the filing date of the present application. Nothing herein is to be construed as an admission that the inventors are not entitled to antedate such disclosure by virtue of prior invention.

It must be noted that, as used in this specification and the appended claims, the singular forms "a," "an," and "the" include plural referents unless the context clearly dictates otherwise. Thus, for example, reference to a textured whey protein product containing "an edible polysaccharide" includes reference to two or more of such edible polysaccharides, reference to "a starch" includes reference to one or more of such starches, and reference to "a calcium salt" includes reference to two or more of such calcium salts.

In describing and claiming the present invention, the following terminology will be used in accordance with the definitions set out below.

As used herein, "comprising," "including," "containing," "characterized by," and grammatical equivalents thereof are inclusive or open-ended terms that do not exclude additional, unrecited elements or method steps. "Comprising" is to be interpreted as including the more restrictive terms "consisting of" and "consisting essentially of."

As used herein, "consisting of" and grammatical equivalents thereof exclude any element, step, or ingredient not specified in the claim.

As used herein, "consisting essentially of" and grammatical equivalents thereof limit the scope of a claim to the specified materials or steps and those that do not materially affect the basic and novel characteristic or characteristics of the claimed invention.

As used herein, "food grade protein" means protein from plant, animal, and microbial sources, and mixtures thereof, that are acceptable for human consumption. These food grade proteins can be in the form of flours, typically comprising about 5-50% protein on a dry weight basis; concentrates, typically comprising up to about 65% protein on a dry weight basis; and isolates, typically comprising up to about 95% protein on a dry weight basis. In addition to whey proteins, other food grade proteins include wheat, rice, soy, corn, and legume proteins, and the like; dairy proteins, such as casein; animal blood proteins; and proteins from yeast and fungi.

As used herein "whey protein" means a concentrated protein preparation from whey. Whey protein concentrate or WPC is one such whey protein. For example, WPC 80 is a whey protein concentrate containing about 80% by weight of protein. Another source of whey protein is sweet whey solids, commonly known as WPC 34 (34% protein on a dry weight basis), but also known as WPC 35 and WPC 37, wherein the numerical designation indicates the percent of protein on a dry weight basis in the preparation. Other sources of whey protein are WPC 50 and WPC 65, which contain 50% and 65%, respectively, protein on a dry weight basis. Still other sources of whey protein include what are known as whey protein isolate or WPI, which contain about 90-95% protein on a dry weight basis. All of these whey protein sources are commercially available from a variety of sources, and methods for making such whey protein preparations are well known in the art. For example, U.S. Pat. No. 4,834,974, describes a method of making a whey protein concentrate.

Amounts of food grade protein that are used in the textured protein products according to the present invention are amounts sufficient to obtain protein concentrations of about 1-80% by weight in the final products. Typical ranges of protein concentrations are about 15-65% by weight and more typical ranges are about 16-48% by weight. The food grade protein can be entirely whey protein, or the food grade protein can be a blend of whey protein and one or more other acceptable proteins of plant, animal, or microbial origin, wherein the whey protein comprises at least about 25% by weight of the total protein. In an illustrative embodiment of the invention, the whey protein can comprise about 25-99% by weight of the food grade protein. In such an embodiment, the whey protein typically comprises about 50-99% by weight of the food grade protein.

As used herein, "edible polysaccharides" include starches, such as cornstarch and other starches such as potato, rice, tapioca, bran, and soy starches and modified variants thereof; cellulosics, such as celluloses and modified celluloses such as carboxymethylcellulose; dietary fibers, such as maltodextrin, inulin, fructo-oligosaccharides, pectin, and guar gum; and mixtures thereof. A preferred edible polysaccharide according to the present invention is cornstarch.

As used herein, "calcium salt" means an edible calcium salt that is suitable for use in food, such as calcium carbonate, calcium chloride, calcium gluconate, calcium lactate, and the like, and mixtures thereof.

As used herein, "pH-adjusting agent" or similar terms means an acid, base, or buffer that is suitable for use in food.

A textured whey protein product having a meat-like texture can be made by thermoplastic extrusion. The texture of this product can be varied depending on the chemical composition of the ingredients and the type of extruder die used. For the production of a textured product, suitable for use as a meat extender or meat analog, dry mixtures of whey protein concentrate and edible polysaccharide are extruded on an twin-screw extruder, preferably at a temperature in the range of about 135-160° C. and at a pressure in the range of about 50-500 psi. For example, thermoplastic extrusion of a mixture of 2 parts by weight of WPC 80 and 1 part by weight of cornstarch results in a textured product with 50% protein. Starting protein levels from 35 to 100 can also result in a textured product. Addition of acid or base to the water inlet stream and/or the addition of calcium to the dry protein/starch mix will also result in a textured product suitable for use as a meat extender or meat analog.

Sensory analysis of the textured whey protein (TWP) samples prepared through the use of acid, base, and/or calcium are described in the examples below. It was found that 30% $TWP_{0.2MNaOH}$ patties are equal to all-beef patties in tenderness, juiciness, texture, flavor, and overall acceptability. Consumers prefer patties with $TWP_{0.2MNaOH}$ used as a meat extender over 30% commercially available textured soy protein patties. In addition, it was found that $TWP_{0.2MNaOH}$ is well accepted by consumers up to a least the 40% level in beef patties. The 40% $TWP_{0.2MNaOH}$ patties had higher cook yield, less diameter reduction, and lower change in thickness than all-beef patties. Sensory analysis of a 100% TWP product was also conducted, and the 100% TWP product was preferred by consumers over a 100% textured soy and other meatless patties.

Another illustrative embodiment of the invention relates to a low fat, sugar-free, high protein snack food. This product can be used, for example, for supplementing the diet with protein. "Low fat" for a snack food is defined as 3 g or less of total fat per 50 g of total product. The present snack product provides about 0.72 g of fat per 50 g (~1.8 oz.), as determined by the Goldfish method (Official Methods of Analysis, Fat, Lactose, Protein and Solids in Milk (AOAC International, Arlington, Va., 16th ed. 1996)). "Sugar-free" is defined as less than 0.5 g sugar per reference serving. The lactose content of the present snack product was analyzed using an enzymatic Bioanalysis assay for lactose (Boehringer Mannheim, Indianapolis, Ind.), which resulted in 0.5 g lactose per 28-g (1-oz.) serving. "High protein" foods are defined as foods containing 20% or more of the Daily Value (DV) of protein per reference amount. The present snack product contains 15 g of protein per 28-g (1-oz.) serving, which is 30% DV.

The snack food product is comprised of the same ingredients as the meat extender or meat analog, the principal difference between the two products being in the method of manufacture. For example, in an illustrative embodiment of the invention, the snack food product is manufactured by extruding whey protein concentrate and cornstarch with 0.1 M NaOH at about 145-147° C. A preferred weight ratio of whey protein concentrate to corn starch is 67% to 33%, while the range of protein in the whey protein concentrate is about 20-80% by weight. As with the meat extender product, the preferred starch is commercial cornstarch, but other starches such as modified corn, potato, modified potato, rice, tapioca, and bran can also be used. The preferred liquid source is 0.1 M NaOH, but other liquids, such as 0-2 M sodium hydroxide or water can also be used. These conditions result in an expanded, crunchy product with small, even cell size. The intended use of the product is to supplement the diet with protein in the form of a convenient snack food.

The textured whey protein product can be puffed or expanded by heating, such as frying, baking, microwave heating, heating in a forced air system, heating in an air tunnel, and the like, according to methods well known in the art.

Several flavoring systems can be used with the textured whey snack (TWS) such as incorporation of flavoring, enrobing, coating, and electrostatic coating, as are well known in the art. Incorporation of flavor into the TWS has been modeled because it requires no additional equipment, does not use additional fat, and results in a powder-free convenient product. The TWS can be fortified by adding vitamins and minerals to a topically applied seasoning.

EXAMPLE 1

Textured whey protein products were made according to the present invention by extruding a raw mix comprising 2 parts by weight of whey protein concentrate (AMPC Inc., Ames, Iowa) and 1 part by weight of cornstarch. The composition of the whey protein concentrate was 80% protein (WPC 80), 4.6% fat, 4.5% ash (0.294% calcium), 4.4% carbohydrate, and 4.2% moisture. The liquid used in the extrusion process was distilled water; 0.1 M, 0.2 M, or 1 M HCl; or 0.1 M, 0.2 M, or 1 M NaOH. Calcium chloride was added to some samples by mixing with the raw mix before extrusion at 0.4%, 0.88%, or 1.69% by weight of calcium calculated on a basis of protein weight. Controls included the raw mix, WPC 80, and raw mix extruded with distilled water.

Extrusion was conducted using an MPF19 twin-screw extruder (APV Baker, Grand Rapids, Mich.) with a cooling die. The cooling die cooled the extrudate prior to return of the extrudate to atmospheric pressure, thus substantially inhibiting expansion or puffing of the final product. In the MPF19 apparatus, dry feed and liquid are added separately and mixed in the barrel. Extrusion parameters were: screw speed of 200 rpm, product temperature at the die of 150° C., feed rate of 23 g/min, and water-flow rate of 11 g/min. Product temperature was measured during extrusion by a thermocouple at the end of the extrusion barrel. Observations were made on color, opacity, structure, and texture for each collected sample. Collected samples were dried at room temperature overnight, then ground to a fine powder (<60 mesh) using a Braun food grinder. The pH of samples was measured in duplicate using 10% (w/v) slurries of powdered sample in distilled water.

Table 1 shows that the pH of the extruded product ranged from 4.0 to 7.5. In general, pH decreased with higher acid levels and increased with higher base levels. Increasing levels of calcium also resulted in decreasing pH values.

TABLE 1

| Variable | pH | Color |
|---|---|---|
| $H_2O$ | 6.45 | Caramel brown |
| 1 M NaOH | 7.48 | Nearly black |
| 0.2 M NaOH | 6.73 | Dark brown |
| 0.1 M NaOH | 6.58 | Light yellow |
| 1 M HCl | 4.03 | Tan/orange |
| 0.2 M HCl | 5.93 | Light brown |
| 0.1 M HCl | 6.25 | Caramel brown |
| 0.4% $Ca^{2+}$ | 6.37 | Brown |
| 0.88% $Ca^{2+}$ | 6.18 | Light brown |
| 1.69% $Ca^{2+}$ | 6.03 | Grayish-brown |

EXAMPLE 2

The water holding capacity (WHC) of dry extruded solids prepared according to the procedure of Example 1 was determined. Briefly, triplicate 1.00-g (dry base, <60 mesh) samples were measured into pre-weighed, 50-ml centrifuge tubes. Distilled water (10 ml) was added to the samples, which were then agitated using a vortexer at low speed for 30 seconds. Samples were then incubated for 60 minutes at room temperature (25° C.), and centrifuged at 5000 rpm for 30 minutes. Supernatants were decanted into pre-weighed 125-ml Erlenmeyer flasks, and the pellets were weighed in the 50-ml tubes. The residual water in the tube was adjusted for by calculating residual water in 10.0 ml distilled water blanks. Supernatants were dried overnight at 100° C., then cooled and weighed to determine the amount of total solids not included in the pellet weight. Variables such as pellet weight, water retained by blank, and decantate solids weight, were determined by subtracting the final weight from the initial weight. WHC was calculated according to the following formula:

$$WHC = \frac{\text{wet pellet wt (g)} - \text{wt water retained by blank (g)}}{\text{total sample wt (g)} - \text{wt decantate solids (g)}}$$

Amounts of soluble protein were also measured. Slurries of protein and solvent, 3.85% (w/v), were shaken for 1.5 hours at 150 rpm and then centrifuged for 5 minutes at 5000 rpm followed by 15 min at 9000 rpm to precipitate fine particles. Protein content of the supernatants was determined spectrophotometrically. Experimental samples were diluted within the range of the standard curve, and buffer concentrations were sufficiently diluted to not interfere with the assay. Controls were diluted 1:10 (v/v) with distilled water. Standard curve samples were adjusted to the same buffer concentration as experimental samples.

Each of the extruded textured whey protein products (TWPs) in Table 1 had higher ($p<0.05$) water holding capacity (WHC) than WPC 80 and the raw mix. The highest ($p<0.05$) WHC among extruded samples was measured in TWP extruded with base, followed closely by TWP extruded with high levels of calcium (0.88% $Ca^{2+}$ and 1.69% $Ca^{2+}$). WHC was the lowest ($p<0.05$) when TWP was extruded with acid, water, or low levels of added calcium (0.4% $Ca^{2+}$). There were no significant differences between the total protein of the samples as determined by the Kjeldahl nitrogen method. The average percent total protein content of TWP samples was 50.55%±0.56. In water, TWP had less soluble protein ($p<0.05$) than WPC 80 or the raw mix. This indicates that protein interactions were increased by extrusion. Among extruded samples, soluble protein was lowest ($p<0.05$) in TWP extruded with acid or 0.88% $Ca^{2+}$.

No more than 15% of the total protein was solubilized by extraction in solvents. The remaining protein was most likely stabilized by nonspecific covalent bonds. Previous research suggests that at high temperatures, 100° C. to 150° C., irreversible chemical changes occur, such as Malliard reactions, cysteine breakdown, and possibly breakdown of disulfide bonds. Also, at high pH, cysteine breakdown increases, dehydro-alanine forms, and if lactose is present, lysine is destroyed. All of these reactions are likely to lead to formation of covalent bonds. Perhaps disulfide bonds form initially to mediate protein network aggregation, and are broken down and replaced by other types of covalent bonds that stabilize the networks.

EXAMPLE 3

The objective of this experiment was to determine which TWPs were acceptable to consumers. A panel was used to screen a variety of TWPs developed by adjusting pH and calcium levels during extrusion. In the experiment, 83 panelists tested six samples, namely, (1) all beef patties, (2) TWP extruded with 0.2 M NaOH ($TWP_{0.2MNaOH}$), (3) TWP extruded with 1.69% calcium (w/w protein) added ($TWP_{1.69\%Ca2+}$), (4) TWP extruded with water ($TWP_{H2O}$), (5) TWP extruded with 0.1 M HCl ($TWP_{0.1HCl}$), and (6) textured soy protein (TSP; Central Soya, Fort Wayne, Ind.). All meat extenders were added to the ground beef at the 30% level (weight hydrated extender/weight patty). All variables were standardized to 20% fat using lean and fat meat mixes.

Lean and fat ground beef was purchased from the Utah State University meat laboratory, and fat content was determined using the Babcock for meat method (S. S. Nielson, Introduction to the Chemical Analysis of Foods (Jones & Bartlett Publishers, Boston, 1994)). Mixtures of ground beef and TWPs prepared according to the procedure of Example 1 were formulated. An all-beef mixture and a mixture containing the textured soy protein (TSP) concentrate were the controls.

Table 2 shows the proportions of ingredients used in these formulations.

TABLE 2

| Treatment | 30% Fat Beef | 20% Fat Beef | Hydrated Meat Extender |
|---|---|---|---|
| All Beef | 0% | 100% | 0% |
| $TWP_{0.2MNaOH}$ | 60.2% | 9.8% | 30% |
| $TWP_{1.69\%Ca2+}$ | 60.2% | 9.8% | 30% |
| $TWP_{H2O}$ | 60.2% | 9.8% | 30% |
| $TWP_{0.1MHCl}$ | 60.2% | 9.8% | 30% |
| TSP | 60.2% | 9.8% | 30% |

Dry pieces of TWP and TSP were hydrated with water at a 1.5:1 ratio (w/v) for no less than 10 minutes. Extenders were then mixed with lean and fat ground beef and formed into patties. Patties (~113 g, raw weight) were made using a 10-cm diameter and 1.2-cm height mold, and cooked on 177° C. (350° F.) grills for four minutes on each side, or until they reached internal temperature of 82° C. (180° F.). Samples were then salted, cut crosswise into four equal pieces, and served hot to panelists.

Panelists were served samples in booths, under red lights, in an open consumer panel. Samples were assigned random three-digit numbers and rotated in ballot position to prevent bias. Panelists were asked to evaluate samples for tenderness, juiciness, texture, flavor, and overall acceptability using a hedonic scale from 1=dislike extremely, to 9=like extremely, with a median of 5=neither like nor, dislike. Panelists were encouraged to rinse their mouths with water between samples, and given opportunity to comment on each sample.

The results of this experiment (Table 3), indicate significant differences ($p<0.05$) in tenderness, juiciness, texture, flavor, and overall acceptability of the samples. $TWP_{0.2MNaOH}$ scored equal ($p<0.05$) to all-beef patties in all the measured sensory attributes. Both had significantly higher scores ($p<0.05$) than all other samples in all areas, except juiciness, were $TWP_{H2O}$ was not significantly different ($p<0.05$). Also, $TWP_{0.2MNaOH}$ was the only sample with average scores above 6=like slightly, in every category. These results imply that $TWP_{0.2MNaOH}$ was preferred by panelist over the other TWP and TSP samples at the 30% level.

TABLE 3

| Treatment | Tenderness | Juiciness | Texture | Flavor | Acceptability |
|---|---|---|---|---|---|
| All Beef | $6.17^A$ | $5.87^{A,B}$ | $6.32^A$ | $6.45^A$ | $6.35^A$ |
| $TWP_{0.2MNaOH}$ | $6.67^A$ | $6.19^A$ | $6.16^A$ | $6.28^A$ | $6.32^A$ |
| $TWP_{1.69\%Ca2+}$ | $5.77^{B,C}$ | $5.57^B$ | $4.60^{B,C}$ | $5.51^B$ | $5.14^B$ |
| $TWP_{H2O}$ | $5.64^{C,B}$ | $5.65^{A,B}$ | $4.53^C$ | $5.27^{B,C}$ | $5.01^B$ |
| $TWP_{0.1MHCl}$ | $4.86^D$ | $4.90^C$ | $3.43^D$ | $4.73^C$ | $4.69^B$ |
| TSP | $5.23^{C,D}$ | $4.78^C$ | $5.19^B$ | $4.00^D$ | $4.23^B$ |

Statistics were calculated with analysis of variance using SAS (Cary, NC). Within a column, letters denote samples that are significantly different from each other (LSD, $p < 0.05$).

EXAMPLE 4

Instrumental analysis was conducted on the formulations described in Example 3. Measurements of peak force were made using a penetrometer. Patties were positioned on a stage placed on a top-loading balance with 1-g readability. The patties were centered beneath a rod that resolves to a 1.9-cm diameter steel ball. The rod advanced at a maximum rate of 2 cm/min, and the load in grams was recorded manually every 5 seconds until the rod penetrated the patty.

In instrumental analysis, the results of which are shown in Table 4, the all-beef patties and 30% TSP patties exhibited resistance to higher ($p<0.05$) peak forces than 30% TWP patties. This indicates that 30% TSP patties had greater resistance to breakage. Yet, in Example 3 the panelists perceived 30% $TWP_{0.2MNaOH}$ patties as more tender, with better texture than 30% TSP. Within 30% TWP patties, $TWP_{0.2MNaOH}$ resisted the highest ($p<0.05$) peak force.

TABLE 4

| Treatment | Peak Force (g) |
|---|---|
| All beef | $1418.3^A$ |
| $TWP_{0.2MNaOH}$ | $1081.9^B$ |
| $TWP_{1.69\%Ca2+}$ | $693.6^C$ |
| $TWP_{H2O}$ | $565.1^{C,D}$ |
| $TWP_{0.1MHCl}$ | $419.2^D$ |
| TSP | $1530.9^A$ |

Statistics were calculated with analysis of variance using SAS (Cary, NC). Within a column, letters denote samples that are significantly different from each other (LSD, $p < 0.05$).

TSP was the only sample with a break point comparable to the all-beef patties. Sensory results (Example 3) indicated that using $TWP_{0.2MNaOH}$ as a meat extender resulted in a more tender and juicy product than using TSP. TSP also had the lowest ($p<0.05$) scores for flavor, and many panelists commented that it had a grain-like flavor.

EXAMPLE 5

This example focused on $TWP_{0.2MNaOH}$, the most successful formulation from Example 3. The objective was to determine the maximum usage level of TWP. $TWP_{0.2MNaOH}$ was tested at three usage levels, 30%, 40%, and 50% by weight, and compared to all-beef patties. All patties were standardized to 10% fat, and 2.5 teaspoons salt per 2.5-kg (5.5-pound) batch. Samples were evaluated by 88 panelists.

Patties were prepared according to the procedure of Example 3 except the proportions of ingredients were as set forth in

TABLE 5

| Treatment | 27.2% Fat Beef | 5% Fat Beef | Hydrated Meat Extender |
|---|---|---|---|
| All Beef | 22.5% | 77.5% | 0% |
| 30% $TWP_{0.2MNaOH}$ | 29.3% | 40.7% | 30% |
| 40% $TWP_{0.2MNaOH}$ | 31.5% | 28.5% | 40% |
| 50% $TWP_{0.2MNaOH}$ | 33.8% | 16.2% | 50% |

The final fat content of raw patties was 10% in this experiment as compared to 20% for the experiment described in Example 3. Fat content was lower in the present experiment because the relatively high levels of meat extender limited the amount of ground beef added. The 27.2% fat beef was purchased off the shelf in a local supermarket, and the 5% fat beef was the leanest that could be custom made.

In the sensory analysis of these formulations, shown in Table 6, no differences ($p<0.05$) were found between the all-beef patties and the 30% and 40% $TWP_{0.2MNaOH}$ patties. The 50% $TWP_{0.2MNaOH}$ patties, however, received lower scores for texture, flavor, and overall acceptability. At high levels of added $TWP_{0.2MNaOH}$, the texture became too soft, and was thus not acceptable to consumers. Optimization of TWP production or use of binders would further increase the acceptable usage levels of TWP in beef patties. For example, use of binders allows production of 100% TWP patties.

TABLE 6

| Treatment | Tenderness | Juiciness | Texture | Flavor | Acceptability |
|---|---|---|---|---|---|
| All beef | $6.77^{NS}$ | $6.48^{NS}$ | $6.29^A$ | $6.49^A$ | $6.53^A$ |
| 30% $TWP_{0.2MNaOH}$ | $6.70^{NS}$ | $6.49^{NS}$ | $6.36^A$ | $6.49^A$ | $6.51^A$ |
| 40% $TWP_{0.2MNaOH}$ | $6.60^{NS}$ | $6.45^{NS}$ | $6.60^A$ | $6.28^A$ | $6.34^A$ |
| 50% $TWP_{0.2MNaOH}$ | $6.20^{NS}$ | $5.98^{NS}$ | $5.31^B$ | $5.27^B$ | $5.56^B$ |

Statistics were calculated with analysis of variance using SAS (Cary, NC). Within a column, letters denote samples that are significantly different from each other (LSD, $p < 0.05$).

EXAMPLE 6

Physical and instrumental analysis was completed for all formulations shown in Table 5. Physical analysis was conducted by measuring diameter reduction, changes in thickness, and cook yield for ten patties in each treatment in Table 5. After initial measurements of diameter, thickness, and weight were made, patties were cooked according to the method described in Example 3 and cooled to room temperature for final measurements. Physical parameters were determined by taking difference between measurements for raw and cooked samples.

TABLE 7

| Treatment | Peak Force (g) | Cook Loss % | Dia. Red. (cm) | Thickness Red. (cm) |
|---|---|---|---|---|
| All beef | $1478.2 \pm 241.02^A$ | $35.47 \pm 1.10\%^A$ | $2.15 \pm 0.17^A$ | $0.58 \pm 0.14^A$ |
| 30% $TWP_{0.2MNaOH}$ | $602.33 \pm 231.62^B$ | $29.53 \pm 1.91\%^B$ | $1.27 \pm 0.76^B$ | $0.37 \pm 0.29^{A,B}$ |
| 40% $TWP_{0.2MNaOH}$ | $383.2 \pm 76.61^B$ | $25.49 \pm 0.93\%^C$ | $0.97 \pm 0.11^B$ | $0.34 \pm 0.11^B$ |
| 50% $TWP_{0.2MNaOH}$ | $453.4 \pm 37.95^C$ | $24.25 \pm 0.90\%^C$ | $0.43 \pm 0.10^C$ | $0.11 \pm 0.14^C$ |

Statistics were calculated with analysis of variance using SAS (Cary, NC). Within a column, letters denote samples that are significantly different from each other (LSD, $p < 0.05$).

In physical analysis, shown in Table 7, TWP patties had lower ($p<0.05$) percent cook loss than the all beef patties. The reduced percent cook loss can be attributed to whey protein's water-holding and fat-binding characteristics. Because of decreased cook loss, there is less waste and higher nutritional value in the final product, which may lead to increased profits.

TWP patties also had lower diameter reduction ($p<0.05$) than all-beef patties. Patties extended with 40% and 50% $TWP_{0.2MNaOH}$ had less change in patty thickness than all patties. Instrumental analysis for this experiment, shown in Table 7, indicated no differences ($p<0.05$) among the peak forces of the patties with added $TWP_{0.2MNaOH}$. Differences in the peak forces of $TWP_{0.2MNaOH}$ in Table 4 as compared to Table 7 can be attributed to differences in formulation. In the present example, patties containing $TWP_{0.2MNaOH}$ yielded lower ($p<0.05$) peak force measurements than for all-beef patties. Differences were not evident ($p<0.05$) from scores of texture or overall acceptability of the samples.

In summary, altering the pH and calcium level influenced the stability of extruded textured whey proteins. Water holding capacity (WHC) of whey proteins was increased by extrusion. Elevated WHC was promoted by adding base during extrusion. Extrusion also reduced protein solubility of whey proteins in water. Low protein solubility was promoted by extrusion with acid or calcium.

This research showed that beef patties made with 30% $TWP_{0.2MNaOH}$ were equal to all beef patties in tenderness, juiciness, texture, flavor, and overall acceptability. Consumers preferred patties with $TWP_{0.2MNaOH}$ use as a meat extender over those extended with commercially available textured soy protein, at the 30% level. $TWP_{0.2MNaOH}$ was well accepted by consumers up to a least the 40% level in beef patties. At the 40% level, $TWP_{0.2MNaOH}$ had higher cook yield, less diameter reduction, and lower change in thickness than all-beef patties. Thus, $TWP_{0.2MNaOH}$ acts as both a binding agent and a meat extender. This research shows high potential for commercial use of textured whey proteins as a meat extender or meat analog.

EXAMPLE 7

In this example, a textured whey protein product was extruded on an APV Baker MPF19 twin-screw extruder. Liquid, 0.1 M NaOH, was added during extrusion through a water line, pumped at a rate of 11 g/min. A dry mix comprising 2 parts by weight of WPC 80 (AMPC Inc., Ames, Iowa) and 1 part by weight of cornstarch was fed to the extruder's hopper at a rate of 25 g/min. Heating in the extruder was controlled in five sections. The first two sections were kept at room temperature for product mixing. The last three sections were brought up to final temperature (145-147° C.) and pressure (100 psi) to melt and cook the product. As the product exited the die, pressure was released, super-heated moisture flashed off, and the extruded whey protein "dough" expanded. The resulting product had a semi-uniform, cylindrical shape with a diameter of 5 to 8 millimeters. The strands of puffed dough were cut to lengths of 2 to 4 centimeters. These pieces were then dried in an electric oven at 82° C. (180° F.) for 30 minutes and subsequently cooled to room temperature in a tempering room. The resulting product was an expanded, crunchy product with small even cell size.

EXAMPLE 8

A textured whey protein product is prepared according to the procedure of Example 1 except that a whey protein isolate comprising about 95% whey protein is used in place of a whey protein concentrate containing about 80% whey protein.

EXAMPLE 9

A textured whey protein product is prepared according to the procedure of Example 1 except that a mixture of whey protein and soy protein is used in place of a whey protein concentrate. The mixture comprises equal parts by weight of whey protein and soy protein.

EXAMPLE 10

A textured whey protein product is prepared according to the procedure of Example 9 except that the mixture comprises 25% by weight whey protein and 75% by weight soy protein.

EXAMPLE 11

A textured whey protein product is prepared according to the procedure of Example 1 except that a mixture of whey protein and rice protein is used in place of whey protein concentrate. The mixture comprises about 75% by weight of whey protein and about 25% by weight of rice protein.

EXAMPLE 12

A textured whey protein product is prepared according to the procedure of Example 1 except that a mixture of equal parts by weight of whey protein and bovine blood protein is used in place of whey protein concentrate.

The subject matter claimed is:

1. A textured whey protein product comprising a thermoplastic extrusion product of a composition, said composition consisting essentially of 1-80% by weight of a food grade protein and 20-99% by weight of an edible polysaccharide, wherein the food grade protein comprises at least 25% by weight of undenatured whey protein, and wherein said composition is extruded on a thermoplastic extruder and forced through an exit die.

2. The textured whey protein product of claim 1 wherein the composition comprises about 15-65% by weight of the food grade protein.

3. The textured whey protein product of claim 1 wherein the composition comprises about 16-48% by weight of the food grade protein.

4. The textured whey protein product of claim 1 wherein the food grade protein further comprises up to about 75% by weight of plant proteins, animal proteins, microbial proteins, or mixtures thereof.

5. The textured whey protein product of claim 4 wherein the food grade protein comprises plant proteins selected from the group consisting of wheat proteins, rice proteins, soy proteins, corn proteins, legume proteins, and mixtures thereof.

6. The textured whey protein product of claim 4 wherein the food grade protein comprises wheat protein.

7. The textured whey protein product of claim 1 wherein the food grade protein comprises at least about 50% by weight of whey protein.

8. The textured whey protein product of claim 1 wherein the edible polysaccharide is a member selected from the group consisting of starches, cellulosics, dietary fibers, and mixtures thereof.

9. The textured whey protein product of claim 8 wherein the edible polysaccharide is a starch selected from the group consisting of cornstarch, potato starch, rice starch, tapioca starch, bran starch, soy starch, modified variants thereof, and mixtures thereof.

10. The textured whey protein product of claim 9 wherein the edible polysaccharide is cornstarch.

11. The textured whey protein product of claim 8 wherein the edible polysaccharide is a cellulosic selected from the group consisting of celluloses, modified celluloses, and mixtures thereof.

12. The textured whey protein product of claim 8 wherein the edible polysaccharide is a dietary fiber selected from the group consisting of maltodextrin, inulin, fructo-oligosaccharides, pectin, guar gum, and mixtures thereof.

13. The textured whey protein product of claim 1 wherein the composition further comprises a calcium salt.

14. The textured whey protein product of claim 13 wherein the calcium salt is a member selected from the group consisting of calcium carbonate, calcium chloride, calcium gluconate, calcium lactate, and mixtures thereof.

15. The textured whey protein product of claim 14 wherein the calcium salt is calcium chloride.

16. The textured whey protein product of claim 1 wherein the composition further comprises a pH-adjusting agent.

17. The textured whey protein product of claim 1 wherein the whey protein comprises sweet whey solids.

18. The textured whey protein product of claim 1 wherein the whey protein comprises a whey protein concentrate.

19. The textured whey protein product of claim 1 wherein the whey protein comprises a whey protein isolate.

20. The textured whey protein product of claim 1 wherein the whey protein is a member selected from the group consisting of sweet whey solids, whey protein concentrate, whey protein isolate, and mixtures thereof.

21. A textured whey protein product comprising a thermoplastic extrusion product of a composition, said composition consisting essentially 1-80% by weight of a mixture of food grade proteins and 20-99% by weight of an edible polysaccharide, wherein the mixture of food grade proteins comprises at least 25% by weight of undenatured whey protein, and wherein said composition is extruded on a thermoplastic extruder and forced through an exit die.

22. The textured whey protein product of claim 21 wherein the composition comprises about 15-65% by weight of the mixture of food grade proteins.

23. The textured whey protein product of claim 21 wherein the composition comprises about 16-48% by weight of the mixture of food grade proteins.

24. The textured whey protein product of claim 21 wherein the mixture of food grade proteins further comprises up to about 75% by weight of plant proteins, animal proteins, microbial proteins, or mixtures thereof.

25. The textured whey protein product of claim 24 wherein the mixture of food grade proteins comprises plant proteins selected from the group consisting of wheat proteins, rice proteins, soy proteins, corn proteins, legume proteins, and mixtures thereof.

26. The textured whey protein product of claim 24 wherein the mixture of food grade proteins comprises wheat protein.

27. The textured whey protein product of claim 21 wherein the mixture of food grade proteins comprises at least about 50% by weight of whey protein.

28. The textured whey protein product of claim 21 wherein the edible polysaccharide is a member selected from the group consisting of starches, cellulosics, dietary fibers, and mixtures thereof.

29. The textured whey protein product of claim 28 wherein the edible polysaccharide is a starch selected from the group consisting of cornstarch, potato starch, rice starch, tapioca starch, bran starch, soy starch, modified variants thereof, and mixtures thereof.

30. The textured whey protein product of claim 29 wherein the edible polysaccharide is cornstarch.

31. The textured whey protein product of claim 28 wherein the edible polysaccharide is a cellulosic selected from the group consisting of celluloses, modified celluloses, and mixtures thereof.

32. The textured whey protein product of claim 28 wherein the edible polysaccharide is a dietary fiber selected from the group consisting of maltodextrin, inulin, fructo-oligosaccharides, pectin, guar gum, and mixtures thereof.

33. The textured whey protein product of claim 21 wherein the composition further comprises a calcium salt.

34. The textured whey protein product of claim 33 wherein the calcium salt is a member selected from the group consisting of calcium carbonate, calcium chloride, calcium gluconate, calcium lactate, and mixtures thereof.

35. The textured whey protein product of claim 34 wherein the calcium salt is calcium chloride.

36. The textured whey protein product of claim 21 wherein the composition further comprises a pH-adjusting agent.

37. The textured whey protein product of claim 21 wherein the whey protein comprises sweet whey solids.

38. The textured whey protein product of claim 21 wherein the whey protein comprises a whey protein concentrate.

39. The textured whey protein product of claim 21 wherein the whey protein comprises a whey protein isolate.

40. The textured whey protein product of claim 21 wherein the whey protein is a member selected from the group consisting of sweet whey solids, whey protein concentrate, whey protein isolate, and mixtures thereof.

41. A textured whey protein product comprising a thermoplastic extrusion product of a composition, said composition consisting essentially of about 40-99% by weight of a whey protein concentrate and about 1-60% by weight of an edible polysaccharide, wherein the whey protein concentrate comprises at least about 80% by weight of protein, wherein the whey protein concentrate also comprises at least 25% by weight of undenatured whey protein, and wherein said composition is extruded on a thermoplastic extruder and forced through an exit die.

42. The textured whey protein product of claim 41 wherein the edible polysaccharide is a member selected from the group consisting of starches, cellulosics, dietary fibers, and mixtures thereof.

43. The textured whey protein product of claim 42 wherein the edible polysaccharide is a starch selected from the group consisting of corn, potato, rice, tapioca, bran, and soy starches, modified variants thereof, and mixtures thereof.

44. The textured whey protein product of claim 43 wherein the edible polysaccharide is cornstarch.

45. The textured whey protein product of claim 42 wherein the edible polysaccharide is a cellulosic selected from the group consisting of celluloses, modified celluloses, and mixtures thereof.

46. The textured whey protein product of claim 41 wherein the edible polysaccharide is a dietary fiber selected from the group consisting of maltodextrin, inulin, fructo-oligosaccharides, pectin, guar gum, and mixtures thereof.

47. The textured whey protein product of claim 41 wherein the composition further comprises a calcium salt.

48. The textured whey protein product of claim 47 wherein the calcium salt is a member selected from the group consisting of calcium carbonate, calcium chloride, calcium gluconate, calcium lactate, and mixtures thereof.

49. The textured whey protein product of claim 48 wherein the calcium salt is calcium chloride.

50. The textured whey protein product of claim 41 wherein the composition further comprises a pH-adjusting agent.

* * * * *